M. A. WIIDANEN.
WIRE STRETCHER.
APPLICATION FILED APR. 25, 1914.
1,122,458.
Patented Dec. 29, 1914.
2 SHEETS—SHEET 2.
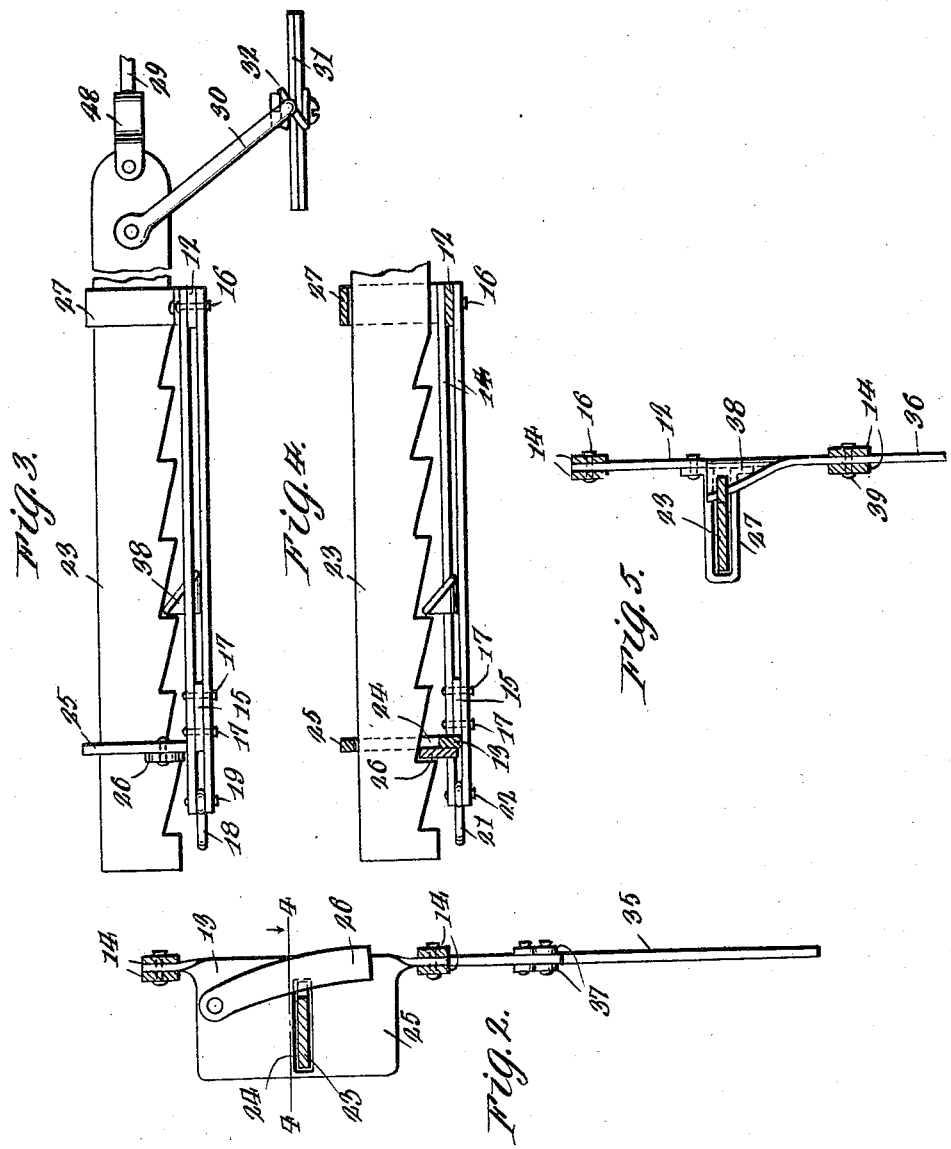

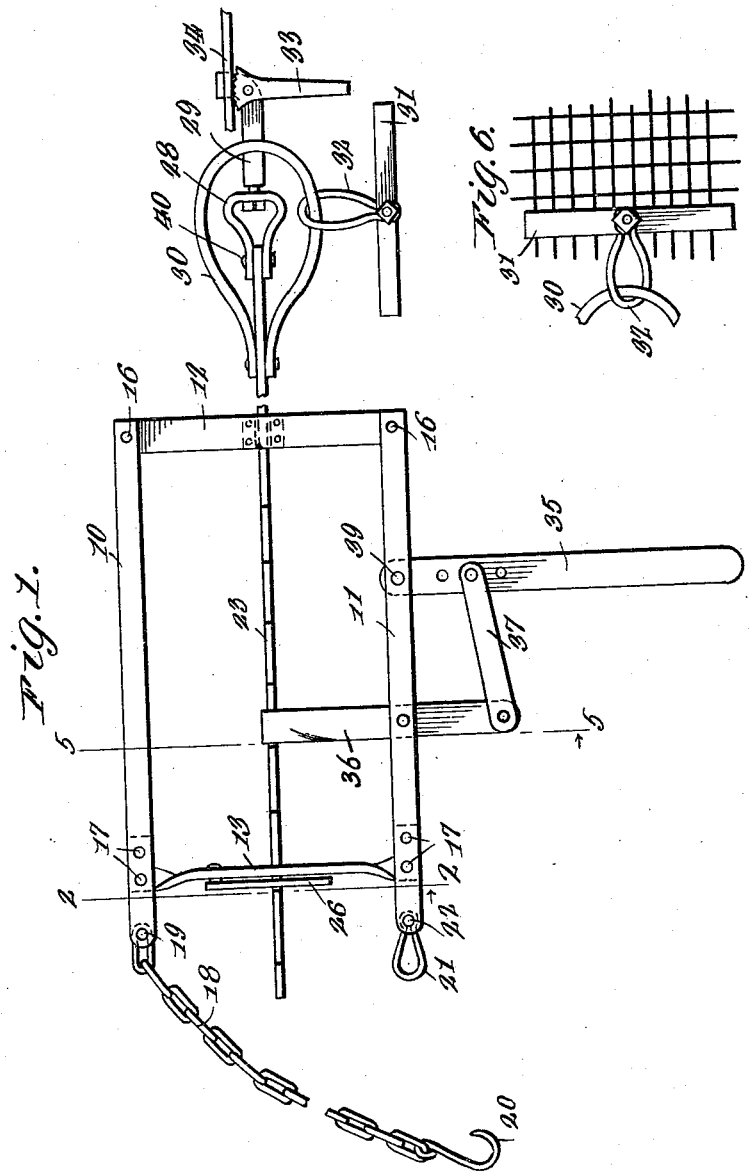

UNITED STATES PATENT OFFICE.

MATT A. WIIDANEN, OF CENTERVILLE, WASHINGTON.

WIRE-STRETCHER.

1,122,458.   Specification of Letters Patent.   Patented Dec. 29, 1914.

Application filed April 25, 1914. Serial No. 834,536.

*To all whom it may concern:*

Be it known that I, MATT A. WIIDANEN, citizen of the United States, residing at Centerville, in the county of Klickitat and State of Washington, have invented certain new and useful Improvements in Wire-Stretchers, of which the following is a specification.

This invention relates to a wire stretcher, and the principal object of the invention is to provide a wire stretcher having the improved wire-engaging means and also improved means for moving the wire-engaging means to stretch the fence wire.

Another object of the invention is to provide an improved type of frame through which the rack bar of the wire-engaging means passes, and to provide the frame with an improved type of actuating lever for the rack bar and also with improved means for holding the rack bar in a tightened position while the actuating lever is being moved to a new grip upon the rack bar.

Another object of the invention is to provide a wire stretcher in which the wire-engaging means may include a clutch for grasping the single wires and also a clutch for engaging woven wire, the two clutches being so mounted that one will not interfere with the operation of the other.

This invention is illustrated in the accompanying drawings wherein—

Figure 1 is a plan view of the complete stretcher; Fig. 2 is a transverse sectional view taken along the line 2—2 of Fig. 1; Fig. 3 is a view showing the stretcher in elevation; Fig. 4 is a sectional view taken along the line 4—4 of Fig. 2; Fig. 5 is a sectional view taken along the line 5—5 of Fig. 1; Fig. 6 is a side view of the clamp in operation.

The frame of this stretcher comprises the side bars 10 and 11, the end bar 12 and cross bar 13. Each of the side bars comprises upper and lower strips 14 which are secured above and below the end bar 12 and between which the feet 15 of the cross bar 13 are positioned to securely hold the cross bar in place. The end bar 12 is secured by the bolts or rivets 16 and the feet of the cross bar 13 are secured by means of the bolts or rivets 17 so that the feet of the cross bar will be securely held between the upper and lower strips 14 as shown clearly in Figs. 3 and 4. A chain 18 has one of its links pivotally mounted upon a pin 19 and has its opposite end provided with a hook 20 for engaging the eye 21 carried by the pin 22.

The rack bar 23 is slidably mounted in a slot 24 formed in the blade 25 of the cross bar 13, and has its teeth cut for engagement by the latch 26 pivotally connected with the blade 25, as clearly shown in Fig. 2. The forward end portion of the rack bar 23 extends through a guiding and supporting bracket 27 carried by the end bar 12, and has its forward end connected with the small clevises 28 with which the clutch jaw 29 is rotatably connected. The large clevis or loop 30 is pivotally connected with the forward portion of the rack bar 23 and carries the woven wire clamp 31 which is connected with the loop 30 by means of its eye 32 preferably formed of resilient material. The usual lever 33 is provided for gripping the wire strand 34 so that the single strands of a fence formed of wire, such as barb-wire, may be gripped.

The operating lever 35 is pivotally mounted between the upper and lower strips of the side bar 11, and is connected with the pivotally-mounted pawl 36 by means of the links 37. The inner end portion of this pawl 36 is provided with a triangular shaped tooth 38 which engages the teeth of the rack bar 23 and moves the rack bar longitudinally of the frame when the operating lever 35 is moved upon its pivot pin 39.

When using this wire stretcher, the chain 18 is passed around a post and the hook 20 connected with the eye 21. The wire from which the fence is made is then drawn as tightly as possible and connected with either the woven wire clutch 31 or with the single wire clutch 29 according to the character of wire to be stretched. If a single strand of wire is being tightened, the wire clamp will be moved to the position shown in Fig. 1 where it will be out of the way; but if the woven wire clamp is to be used, the single wire clamp will be permitted to swing out of the way upon the pivot pin 40. After the wire has been connected with the stretcher, the lever 35 will be operated to move the pawl 36 and move the rack bar 23 longitudinally through the frame. As the lever 35 is moved toward the end bar 12, the pawl will move the rack bar toward the cross bar 13 and the rack bar will ride past the latch 26. When the lever 35 is moved in the opposite direction toward the cross bar 13 to move the pawl 36 to obtain a new hold upon the teeth of the bar 23, the rack bar will be engaged by the latch 26 and thus prevented from slipping while a new hold is being obtained by the pawl 36. It is of course obvious that the rack bar may be formed as long as desired so that the wire from which the pins are formed may be very tightly stretched.

I have thus provided a wire stretcher which is very simple in construction but which will operate very efficiently and will be very strong and durable and not liable to get out of order or break.

I have also provided a wire stretcher which may be used for stretching single wire or woven wire, and which is so constructed that the two clamps may be at all times connected with the rack bar without getting in each other's way when the stretcher is in use. This wire stretcher may be formed any size desired, but in actual use, it has been found that a relatively small stretcher formed as described will stand a great deal of strain and not break or get out of working order.

What is claimed is:

1. A wire stretcher comprising a frame including side bars, an end bar, a cross bar provided with a slot, a rack bar passing through the slot of said cross bar, a supporting and guiding bracket for said rack bar carried by said end bar, clutch means carried by said rack bar, a latch carried by said cross bar for engaging said rack bar, a pawl pivotally connected with one of said side bars and provided with a tooth engaging said rack bar, a lever pivotally connected with one of said side bars, a link connecting said lever with said pawl, and means for connecting said frame with a support.

2. A stretcher comprising a frame including side bars, an end bar, a cross bar, said side bars including strips positioned in spaced relation, said cross bar being provided with feet extending between said strips and secured between the same, a guiding bracket carried by said end bar, a rack bar slidably carried by the bracket and passing through a slot formed in said cross bar, a latch carried by said cross bar and engaging said rack bar, a pawl pivotally connected with one of said side bars and engaging said rack bar, means for operating said pawl to move said rack bar longitudinally of said frame, and guiding means connected with said rack bar.

3. A wire stretcher comprising a frame including side bars, a cross bar having its end portions formed into feet secured to said side bars, the central portion of said cross bar being enlarged to form a plate having a transversely-extending slot formed therein, a rack bar slidably connected with said frame and passing through the slot of said plate, means carried by said plate for releasably engaging said rack bar to releasably hold said rack bar in an adjusted position, a pawl pivotally carried by said frame and having its inner end engaging said rack bar, means for moving said pawl to move said rack bar longitudinally of said frame, and clutch means connected with said rack bar.

In testimony whereof I affix my signature in presence of two witnesses.

MATT A. WIIDANEN.

Witnesses:
J. C. KAIDERA,
WM. B. HAYDEN.

Copies of this patent may be obtained for five cents each, by addressing the "Commissioner of Patents, Washington, D. C."